United States Patent [19]
Ottens et al.

[11] Patent Number: 5,076,542
[45] Date of Patent: Dec. 31, 1991

[54] BALL-COCK

[75] Inventors: Jan Ottens, Deventer; Bernhard Lodder, Hardenberg, both of Netherlands

[73] Assignee: Nederlandse Industriële Maatschappij Nefit B.V., Deventer, Netherlands

[21] Appl. No.: 673,465

[22] Filed: Mar. 22, 1991

[30] Foreign Application Priority Data

Apr. 2, 1990 [NL] Netherlands ............... 9000772

[51] Int. Cl.⁵ .................................. F16K 5/06
[52] U.S. Cl. ...................... 251/315; 251/367
[58] Field of Search .................... 251/315, 367

[56] References Cited
U.S. PATENT DOCUMENTS 4,697,787 10/1987 Pelleboer .................. 251/315

Primary Examiner—John C. Fox
Attorney, Agent, or Firm—Edmund M. Jaskiewicz

[57] ABSTRACT

Ball-cock made of plastic parts with a spherical shut-off element in a housing with at first end a nesting place for a sealing ring and at the other end an end flange with also a nesting place for a sealing ring, said end flange having a radially projecting peripheral rib snapping into a peripheral groove near the second housing end in the inside wall thereof, housing flange and end flange being each provided with a short cylindrical end stub sealingly accommodated in an outer housing of which the inside end wall determines a nesting place for one of the sealing rings, and which at the other end is shut off by an end flange determining a nesting place for the other sealing ring.

4 Claims, 2 Drawing Sheets

BALL-COCK

BACKGROUND OF THE INVENTION

The invention relates to a ball-cock made of plastic parts with a rotatable, essentially spherical shut-off element, provided with a passage, accommodated in a housing of which the inside wall at the first housing end determines a nesting place for a sealing ring interacting with the shut-off element and which at the other end is shut off by an end flange of which the inside wall also determines a nesting place for a sealing ring interacting with the shut-off element, and which housing also has a guide which is situated at right angles to the passage for the accommodation of a control spindle which is in engagement by the first end with the shut-off element, and the second end of which interacts with a control element.

DESCRIPTION OF THE PRIOR ART

Such a ball-cock is known per se from the European Patent Application 0,051,214.

This known ball-cock is made up of parts which are manufactured by injection moulding and provided with screw thread, guide cams and guide grooves, the manufacture of which parts is not cheap, and which have to be made of a high-grade plastic. The assembly of the cock also has to be carried out with care: it is particularly important that the screwing down of the clamping sleeve by which the end flange guided by the guide cams is pressed in the direction of the ball should be carried out carefully and to the correct extent, in order to ensure both a good seal and ease of operation of the cock.

BACKGROUND OF THE INVENTION

The object of the invention is to eliminate these disadvantages and to provide a ball-cock of the type mentioned in the introduction which can be assembled in a very simple manner.

This object is achieved in that the end flange is accommodated with a radially projecting peripheral rib snapping into a peripheral groove formed near the second housing end in the inside wall thereof, in that housing flange and end flange are each provided with a short cylindrical end stub around which a sealing ring is fitted, and are accommodated in an outer housing which is also made of plastic and is provided with a guide part for the control spindle, and of which the inside end wall merging into a first connection stub determines a nesting place for one of the sealing rings, and which at the other end is shut off by an end flange which is provided with a second connection stub and of which the inside wall determines a nesting place for the other sealing ring.

By means of the sealing rings the inner housing is accommodated in a sealing manner and "floating" in the outer housing, so that no high standards are set for the accuracy with which the end flange is fixed to the outer housing; the end flange of the inner housing is always fixed at the correct place during the assembly by snapping the radial peripheral rib thereof into the peripheral groove of the cylindrical part, so that the O-rings ensuring the seal of the ball are always pressed at the correct pre-tension.

Preferably a peripheral groove is formed in the control spindle near the first end, into which groove a radially inward projecting peripheral rib formed in the spindle guide snaps, while the spindle guide part formed on the outer housing is designed with a cylindrical outer wall from which projects a peripheral rib which snaps into a peripheral groove formed in the cylindrical inside wall of a casing flange going out from the control element.

In a preferred embodiment a sealing ring is accommodated between the control spindle and the spindle guide, between the control spindle and the spindle guide part, and a sealing ring is accommodated between the outside wall of the spindle guide part and the inside wall of the casing flange containing the latter.

DESCRIPTION OF A PREFERRED EMBODIMENT

Figure 1:
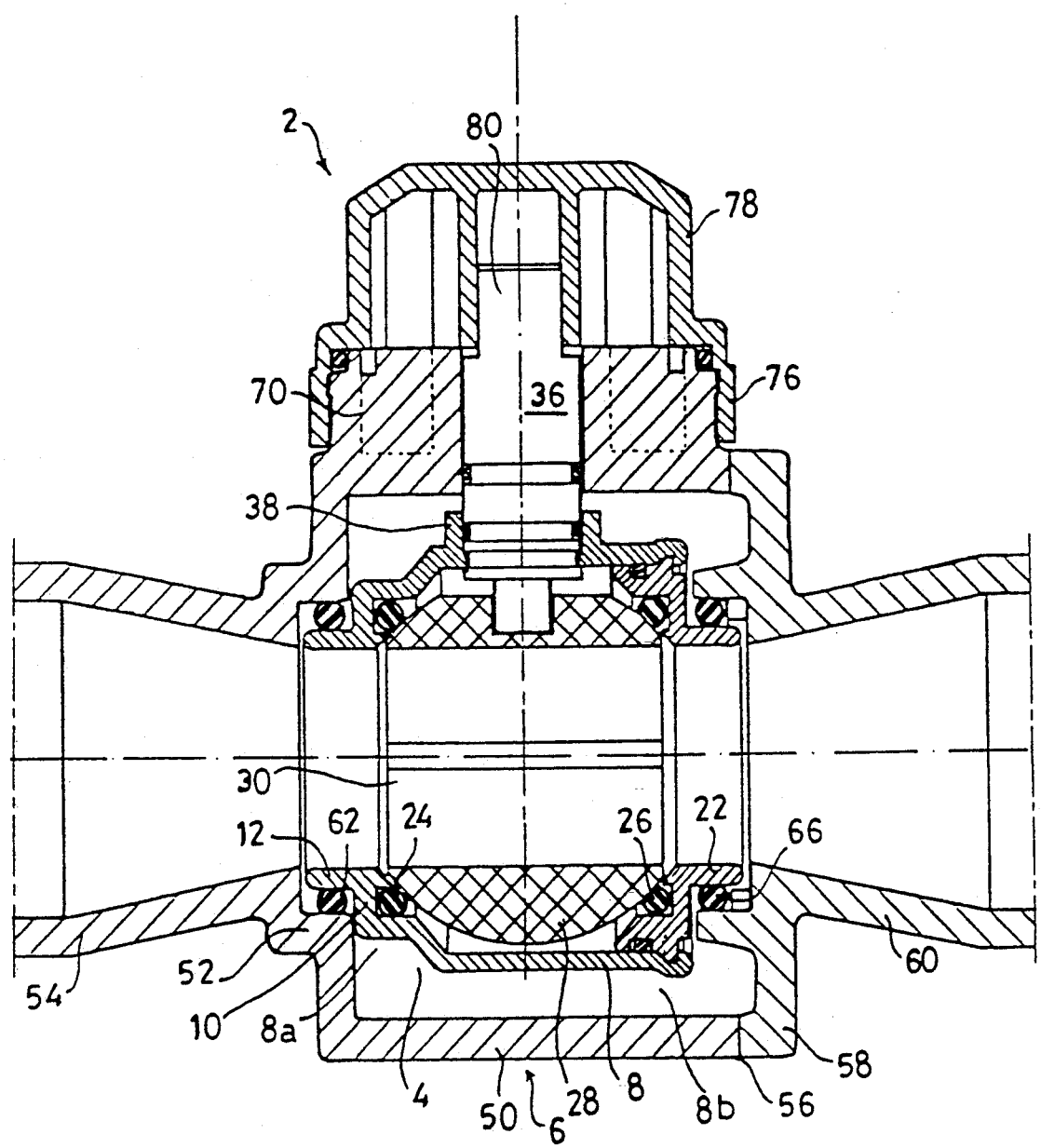
FIG. 1 is a longitudinal section through the ball-cock according to the invention.
Figure 2:
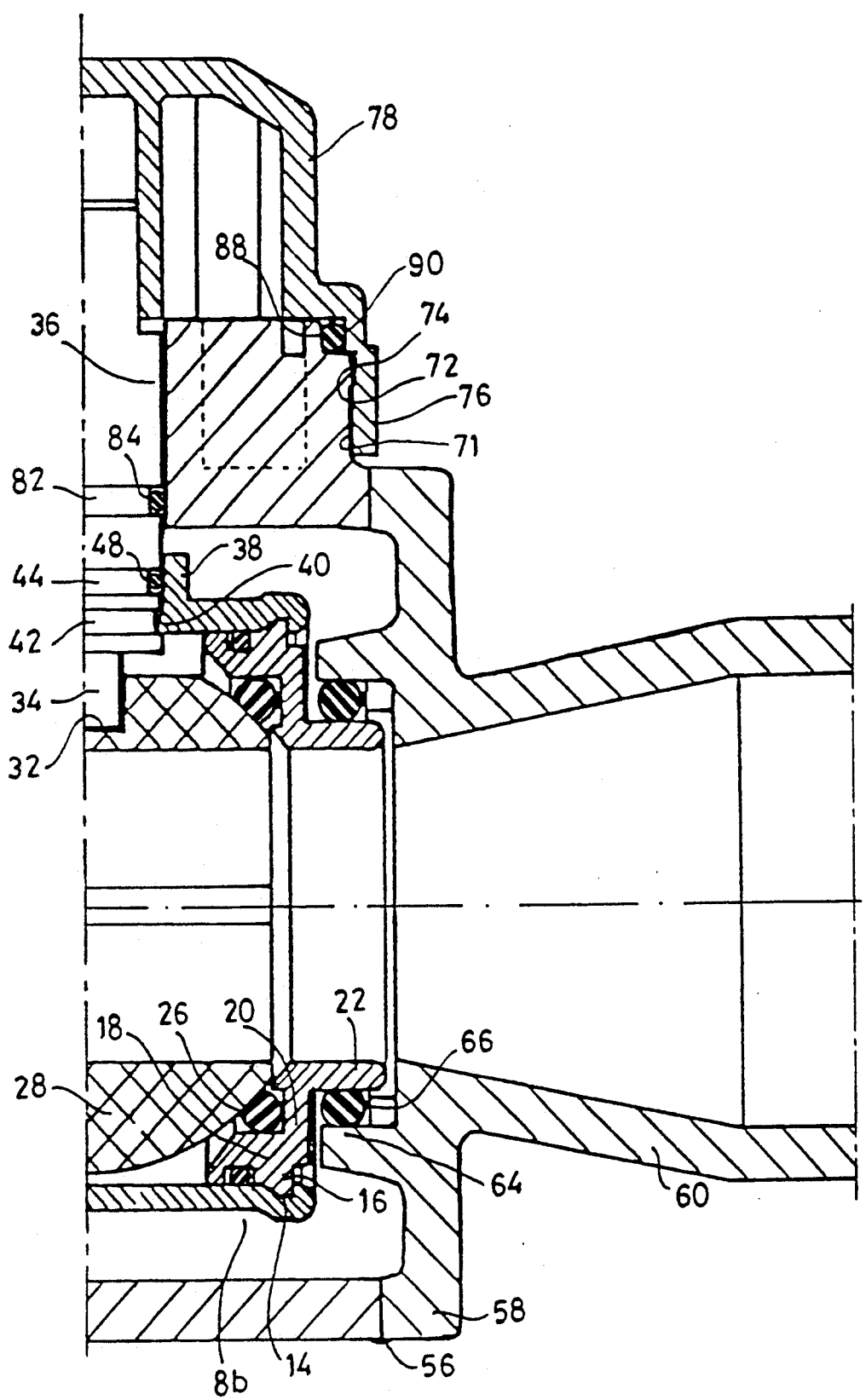
FIG. 2 is a longitudinal section on an enlarged scale of a part of this cock.

The ball-cock indicated in its entirety by the reference number 2 in the figures comprises an inner housing 4 which is accommodated in an outer housing 6. The inner housing comprises a cylindrical part 8 which narrows at the first housing end 8a via a stepped part 10 to a cylindrical end stub 12. At the second housing end 8b—see FIG. 2—a peripheral groove 14 is formed in the inside wall of the housing and into it fits the radially outward projecting peripheral rib 16 of the end flange 18 shutting off the inner housing. This end flange 18 too narrows via a stepped part 20 to the cylindrical end stub 22. The inside wall of the stepped part 10, 20 determines a peripheral groove in which an O-ring 24, 26 respectively is accommodated. The essentially ball-shaped shut-off element 28 with passage 30 is confined between said O-rings. The ball 28 has a recess 32 for the accommodation of the complementarily shaped end 34 of the control spindle 36. This control spindle is guided in the guide 38 formed on the inner housing and lying at right angles to the passage 30. This guide 38 has a radially inward projecting peripheral rib 40 which snaps into the peripheral groove 42 formed in the spindle 36. An O-ring provided in a peripheral groove 44 of the spindle 36 situated above that gives an additional seal.

The outer housing 6 too has a cylindrical part 50 which merges after a stepped part 52 into the first connection stub 54, and this cylindrical part 50 is shut off at the other end by an end flange 58 joined thereto at the point 56 by butt-welding or another suitable method, for example gluing, which end flange bears the second connection stub 60. The inside wall of the stepped part 60 determines a nesting place for an O-ring 62, accommodated between the cylindrical end stub 12 and this inside wall, while the end flange 58 bears an axially directed cylindrical projection 64 which forms a nesting place for an O-ring 66 which fits around the cylindrical end stub 22 of the inner housing 4. The inner housing 4 is thus accommodated in a sealing manner in the outer housing 6.

The cylindrical part 50 of the outer housing 6 also bears a spindle guiding part 70 with a cylindrical outer wall 71 from which a peripheral rib 72 projects (see FIG. 2), which rib fits in the peripheral groove 74 formed in the casing flange 76 of the control knob 78. This control knob 78 is fitted on the end 80 of the spindle 36. This spindle 36 is also provided with a third peripheral groove 82 containing the O-ring 84 for obtaining a seal between the spindle 36 and the central bore 86 in the spindle guide part 70.

An O-ring 90 which rests against the inside wall of the casing flange 76 is fitted around the narrowed top part 88 of the spindle guide part 70.

It can be seen from the above that the assembly of the ball-cock merely involves fitting the different O-rings at the correct places, interconnecting the component parts by snapping them into each other, and as the final action connecting the end flange 58 and the end edge of the cylindrical outer housing part 50 by welding. Exact positioning is not necessary here, because the inner housing 4 accommodated "floating" in the outer housing 6 is always sealed well relative to its environment by the O-rings 62 and 64.

What is claimed is:

1. Ball-cock made of plastic parts with a rotatable, essentially spherical shut-off element, provided with a passage, accommodated in a housing of which an inside wall at first housing end determines a nesting place for a sealing ring interacting with the shut-off element and which at a second end is shut off by an end flange of which an inside wall also determines a nesting place for a sealing ring interacting with the shut-off element, and which housing also has a guide which is situated at right angles to the passage for the accommodation of a control spindle which is in engagement by a first end with the shut-off element, and a second end of which interacts with a control element, wherein the end flange is accommodated with a radially projecting peripheral rib snapping into a peripheral groove formed near the second housing end in the inside wall thereof, in that housing flange and end flange are each provided with a short cylindrical end stub around which a sealing ring is fitted, and are accommodated in an outer housing which is also made of plastic and is provided with a guide part for the control spindle, and of which an inside end wall merging into a first connection stub determines a nesting place for a sealing ring, and which at the other end is shut off by an end flange which is provided with a second connection stub and of which an inside wall determines a nesting place for an other sealing ring.

2. Ball-cock according to claim 1, in which a peripheral groove is formed in the control spindle near the first end, into which groove a radially inward projecting peripheral rib formed in the spindle guide snaps, while the spindle guide part formed on the outer housing is designed with a cylindrical outer wall from which projects a peripheral rib which snaps into a peripheral groove formed in the cylindrical inside wall of a casing flange going out from the control element.

3. Ball-cock according to claim 2, in which a sealing ring is accommodated between the control spindle and the spindle guide, between the control spindle and the spindle guide part, and a sealing ring is accommodated between the outside wall of the spindle guide part and the inside wall of the casing flange containing the latter.

4. Ball-cock according to claim 1, in which the end flange of the outer housing is connected thereto by welding.

* * * * *